Jan. 7, 1958   F. O. LUENBERGER   2,819,101
SEAL STRUCTURE FOR SUBMERSIBLE APPARATUS
Filed June 9, 1950   3 Sheets-Sheet 1

INVENTOR.
Frederick O. Luenberger
BY
John Flam
ATTORNEY.

Jan. 7, 1958 F. O. LUENBERGER 2,819,101
SEAL STRUCTURE FOR SUBMERSIBLE APPARATUS
Filed June 9, 1950 3 Sheets-Sheet 3
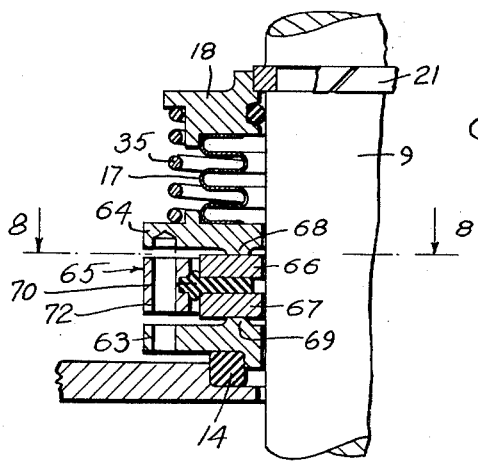
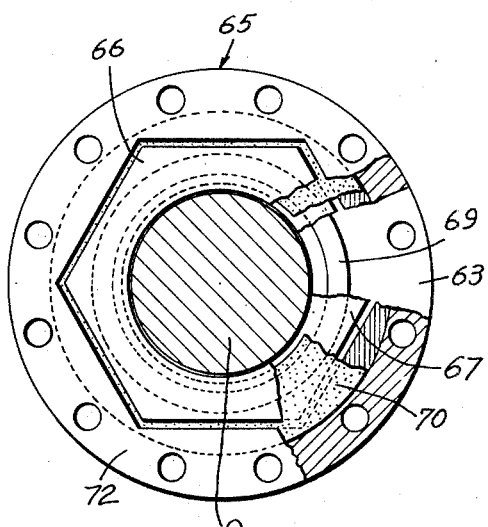
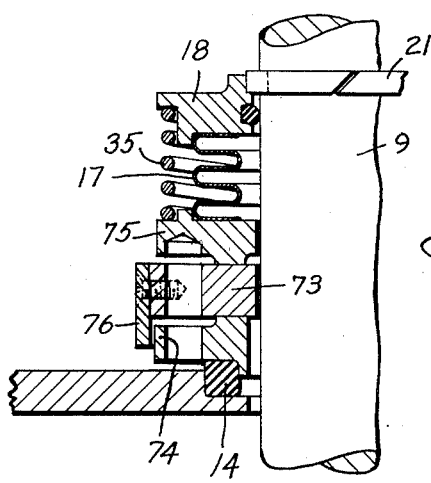
INVENTOR.
Frederick O. Luenberger.
BY
John Flam
ATTORNEY.

United States Patent Office 2,819,101
Patented Jan. 7, 1958

2,819,101

SEAL STRUCTURE FOR SUBMERSIBLE APPARATUS

Frederick O. Luenberger, Los Angeles, Calif., assignor to U. S. Electrical Motors, Inc., Los Angeles, Calif., a corporation of California Application June 9, 1950, Serial No. 167,107

3 Claims. (Cl. 286—11)

This invention relates to seals adapted for apparatus that is submerged in a liquid.

Submersible electric motors have been designed for use in a well for driving a pump. Such motors usually employ an oil-filled casing from which the drive shaft extends upwardly. The seal structure is utilized to prevent entry of water into the casing around the shaft.

It has been proposed, in the past, to provide for this purpose a pair of collars, or rings, respectively carried by the shaft and the motor casing, and urged into sealing contact as by a spring.

Such an arrangement necessarily involves relative rotation between the sealing members corresponding to the speed of the shaft. This high relative rotation not only causes considerable wear, but also induces emulsification between the oil and water.

It is one of the objects of this invention to improve such seal structures, especially to reduce the wear and the emulsification.

In order to accomplish this result, the seal structure is so arranged that the relative rotation between the sealing members is greatly reduced, and particularly by the aid of a multi-stage seal structure.

It is, accordingly, another object of this invention to provide a multi-stage seal structure in which the rotation of the shaft with respect to the casing is divided among a number of separate seals. In this way, the relative rotation between each pair of sealing members is greatly reduced.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

Figure 1:
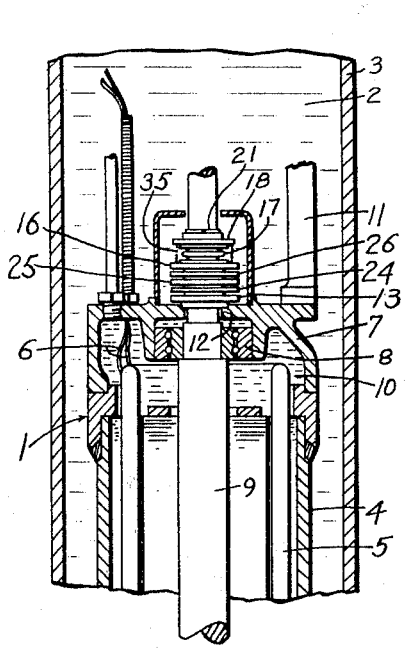
Figure 1 is a fragmentary, sectional view of a submersible motor disposed in a well and equipped with a sealing structure embodying the invention.
Figure 2:
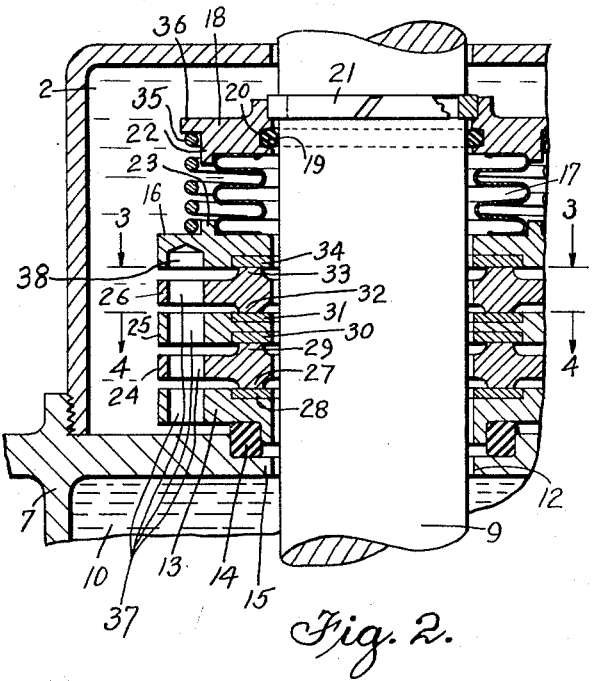
Fig. 2 is an enlarged fragmentary, sectional view illustrating the sealing structure.
Figure 3:
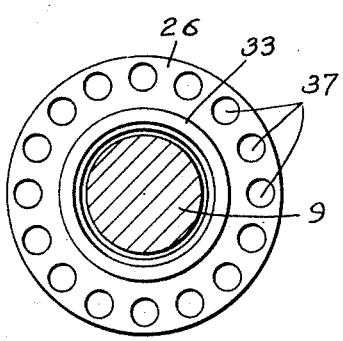
Figure 4:
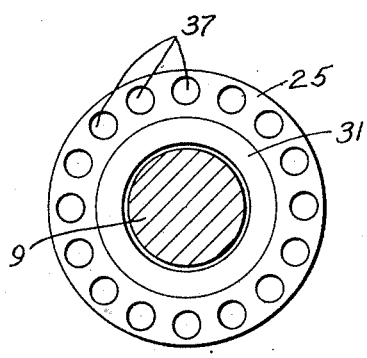
Figure 5:
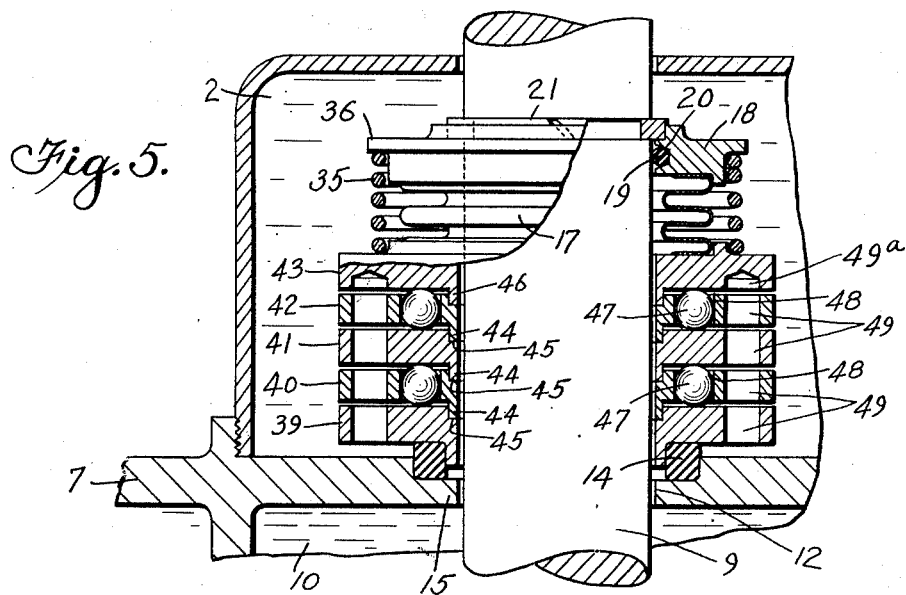
Figure 6:
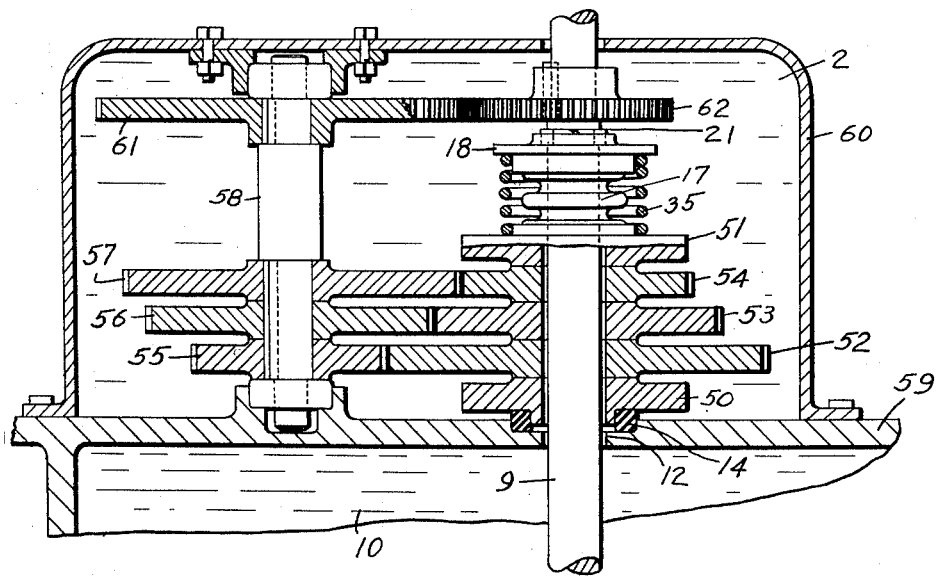

Figs. 3 and 4 are sectional views, taken along planes corresponding, respectively, to lines 3—3 and 4—4 of Fig. 2;

Fig. 5 is a view, similar to Fig. 2, of a modified form of the invention;

Fig. 6 is a view, similar to Fig. 2, of a further modified form of the invention;

Fig. 7 is a fragmentary view, similar to Fig. 2, of another modified form of the invention;

Fig. 8 is a sectional view, taken along a plane corresponding to line 8—8 of Fig. 7; and Fig. 9 is a view similar to Fig. 7, of a further modification.

In the present instance, a submersible structure 1 is illustrated, shown as submerged in a body of water 2 located in a well casing 3. The submersible structure includes a casing 4 enclosing an electric motor such as an induction motor, having the stator winding 5.

The connections 6 for this stator winding pass through the top cover member 7 of the casing and upwardly to the surface of the well. An appropriate bearing structure 8 is included for the shaft 9 of the motor. The casing 4 is filled with a lubricant 10, such as an oil.

The shaft 9 is intended to operate a pump, or the like, joined to the motor casing 4, as by the aid of the brackets indicated by reference character 11.

The shaft 9 passes through an aperture 12 in the cover 7 (see, also, Fig. 2).

In order to seal against the ingress of water around the shaft 9 into the casing, or the egress of oil from the casing, a seal structure is provided. This seal structure includes, in the present instance, a non-rotary sealing member 13, in the form of an annular ring. This sealing member 13 is supported resiliently, as by the aid of a rubber ring 14, disposed against, and attached to, a shoulder 15 of the cover 7. A similar sealing member 16 is shown axially spaced above the sealing member 13. This sealing member 16 is joined, as by a corrugated metal bellows structure 17, to a collar 18 mounted upon the shaft 9. The lower end of this bellows member 17 is attached, as by soldering, to the upper surface of the member 16. Its upper end is similarly attached to the lower surface of the collar 18. This collar 18 is mounted on the shaft by the aid of a compressible rubber ring 19 engaged in a groove 20 in the inner edge of the collar 18. A spring ring 21 engages a groove in the shaft 9 to limit upward movement of the collar 18. Furthermore, in order to provide seats for the ends of the metal bellows 17, the member 16 has an annular rib 23, and the collar 18 has a depending annular rib 22, and defining shoulders for the member 17.

Interposed between the non-rotary sealing member 13 and the rotary sealing member 16 are a series of sealing rings or members 24, 25, and 26. The lowermost sealing member 24 has an annular raised portion or projection 27 in sealing contact with an insert 28 on the upper face of the member 13. Member 24 carries on its upper side a similar annular projection 29 in sealing contact with an insert 30 in the lower side of the member 25. The upper side of the member 25 carries a similar insert 31 in sealing contact with the annular projection 32 of the sealing member 26. The upper surface of the sealing member 26 carries the annular projection 33 in contact with the sealing insert 34 in the lower face of the sealing member 16.

The inserts 28 may be formed of appropriate material, such as metal, carbon, or graphite, that presents the desired sealing characteristics.

All of the members 13, 24, 25, 26, and 16 are urged into sealing contact by the aid of a compression spring 35 disposed between the flange 36 of collar 18 and the upper surface of the member 16. Furthermore, the shaft 9 passes through all of these sealing members with clearance sufficient to permit free rotation, as indicated most clearly in Figs. 2, 3, and 4.

The top sealing member 16 is flexibly connected by the bellows 17 with the shaft 9. Accordingly, whipping or temporary axial misalignment of the shaft 9 does not interfere with the sealing contact of the members. The bellows also seals off the structure between member 16 and collar 36.

The arrangement is such that the intermediate members 24, 25, and 26 are rotated at speeds gradually increasing from the speed of the lowermost member 24 to the uppermost member 26. Assuming, for example, that shaft 9 is rotating at 1800 R. P. M., then the member 26 is arranged to be rotated at about 1350 R. P. M., the member 25 at 900 R. P. M., and the lowermost member 24 at 450 R. P. M. Thus, there are substantially equal differential rates of rotation of these members 24, 25, and 26. The corresponding relative rotation between each sealing member is thus only a fraction of the speed of rotation of shaft 9. Accordingly, there is a reduced rate of wear between the sealing surfaces, and danger of emulsification between the oil 10 in the casing 4 and the water 2 in the well 3 is greatly reduced.

In order to obtain this differential rotation, a hydraulic torque between each pair of adjacent sealing members is effected, as by the aid of liquid driving surfaces carried by these members. These surfaces may be either in the form of ribs or apertures.

In the present instance, each of the members 13, 24, 25, and 26 is provided with through apertures 37, and the upper member 16 is provided with a plurality of angularly spaced recesses 38. The apertures 37 and recesses 38 form irregularities in the opposed surfaces of adjacent members and serve as means for effecting a hydraulic coupling between the members. The well fluid 2 enters the openings of members 13, 24, 25, 26, and 16 through the vertical spacing between the members. The member 26 is caused to rotate by fluid force created between the recesses 38 of the shaft-carried member 16 and the apertures 37 of the member 26; the member 25 is caused to rotate by the fluid force created between the apertures 37 of members 25 and 26; and the member 24 is similarly caused to rotate. Since the member 13 is stationary, its apertures 37 create a viscous drag opposing rotation of the member 24, thereby determining an angular velocity of the member 24 intermediate that of the rotating member 16 and stationary member 13. The member 24, being rotated at an angular velocity less than the member 16, similarly caused its immediately adjacent member 25 to rotate at an angular velocity intermediate that of the member 24 and the rotating member 16. The sealing surfaces 27—34 between the members also impose a force tending to reduce the angular velocities. It is therefore apparent that the combined effect is such that the members 16, 26, 25, and 24, respectively, are caused to rotate at decreasing angular velocities. By appropriate design, therefore, the differential speeds between adjacent sealing members can be made substantially uniform.

In order to provide a protective covering over the sealing structure, a housing is supported on top of the cover 7, and provides a clearance aperture for the shaft 9.

In the form of the invention illustrated in Fig. 5, the lower non-rotary sealing member 39, and the intermediate rings or sealing members 40, 41, and 42 each has a boss 44 nesting within a corresponding cylindrical recess 45 in the next lower sealing member. The uppermost rotary sealing member 43 is similarly provided with a depending cylindrical boss 46 engaging in the sealing member 42. Furthermore, rolling elements, such as balls 47, are disposed for providing rolling friction between the sealing members. Thus, for this purpose, races 48 are provided in the sealing members 42 and 40. Balls 48 carried by these races contact the adjacent sealing members.

The balls 47 and the races 48 can be so arranged as to provide the desired frictional torque between adjacent sealing members. This may be sufficient to produce the desired uniform differential speeds between adjacent sealing members. However, if desired, apertures 49 and recesses 49a may be provided in the sealing members to supplement the friction by a hydraulic torque in a manner set forth in connection with the form illustrated in Figs. 1 to 4.

In the form of the invention illustrated in Fig. 6, a positive transmission device is provided for positively rotating the intermediate series of sealing members. Thus, there is a lowermost non-rotary sealing member 50 and an upper rotary sealing member 51 connected to the shaft 9, as before. Three intermediate sealing members 52, 53, and 54 are provided, arranged axially of the shaft 9 and in sealing contact with adjacent sealing members. The intermediate sealing members 52, 53, and 54 are rotated, in this instance, by the aid of gears 55, 56, and 57 mounted on a shaft 58 parallel ot the shaft 9 and appropriately journalled in the cover member 59 and the protecting housing 60. This shaft is driven by the aid of a gear 61 meshing with a gear 62 keyed to shaft 9. The intermediate members 52, 53, and 54 are provided with teeth meshing with the gears 55, 56, and 57. The gear ratio is such that the desired substantially uniform differential speed between the members is provided.

In the form shown in Figs. 7 and 8, the lowermost ring 63 as before is mounted on the yielding ring 14. The uppermost ring 64 is urged downwardly by the spring 35; and an intermediate ring structure 65 is disposed between the two rings. This ring structure includes an outer ring 72 and two annular seal rings 66 and 67 made of metal, carbon, or graphite, and contacted respectively by the annular portions 68 and 69 of the upper and lower rings. These seal rings 66 and 67 can accommodate themselves readily to these portions, since they are mounted on opposite sides of an intermediate rubber ring support 70. This ring support thus permits the seal rings 66 and 67 to be parallel even when the ring 65 may be out of alignment.

Support 70 is joined to ring 65 by having its outer edge inserted in an annular groove in the ring. Furthermore, as shown most clearly in Fig. 8, rings 66 and 67 have a non-circular configuration to key them to the exterior ring 65 which also has a corresponding non-circular inner periphery.

In Fig. 9, only one intermediate ring 73 is provided. It contacts the lower non-rotary ring 74 as well as the upper rotary ring 75. These rings are constructed generally in the same manner as rings 13 and 16 of Fig. 2.

Ring 73 has a relatively close running clearance with shaft 9, and it also carries an external sleeve 76 overlapping closely the outer periphery of ring 74. In this way, the friction torque of shaft 9 tending to rotate ring 73 is substantially balanced by the drag between sleeve 76 and ring 74.

The invention claims:

1. In a sealing apparatus cooperating with a shaft extending from a casing of a submersible structure: a non-rotary first sealing member surrounding the shaft; a second sealing member axially spaced from the first member and connected to the shaft; and a series of rotary sealing members disposed between the first and second members; all of said sealing members having cylindrical sealing surfaces respectively in contact with cylindrical surfaces on adjacent members; all of said members having portions adapted to be exposed exteriorly of said submersible structure; each of said members having means cooperable with the fluid in which the structure is submerged for producing a relative hydraulic torque between said members when the structure is submerged for causing the members of the series to rotate at different angular velocities; and rolling elements between the members.

2. In a sealing apparatus for a submersible structure having a casing through which a shaft extends: a non-rotary sealing member surrounding the shaft and carried by the casing exteriorly thereof; a rotary sealing member surrounding the shaft and carried by the shaft exteriorly of the casing; a plurality of axially disposed sealing members between said rotary and non-rotary members; all of said members having cooperating sealing surfaces for sealing said shaft with respect to said casing; means provided on each of said members and cooperable with the fluid in which the structure is submerged for establishing a fluid coupling between said members; and rolling elements between the members.

3. In a sealing apparatus for a submersible structure having a casing member and a shaft member extending through the casing member: a pair of relatively rotatable sealing components carried exteriorly of said casing member by said members respectively; a yielding fluid tight connection for one of said components providing relative longitudinal movement between said components; a plurality of rotatable sealing elements disposed between said components; said elements and said components having engaging surfaces establishing a seal for said shaft member with respect to said casing member; said elements and said components each having irregular surfaces opposed to and spaced from its adjacent element or component, said surfaces being in communication with the fluid in which the structure is submerged, and establishing a fluid coupling between said components and said elements; and resilient means urging said one of said components toward the other of said components.

References Cited in the file of this patent

UNITED STATES PATENTS

| | | |
|---|---|---|
| 849,576 | Schulz | Apr. 9, 1907 |
| 1,618,655 | Halvorsen | Feb. 22, 1927 |
| 2,042,691 | Williams | June 2, 1936 |
| 2,148,093 | Wheeler | Feb. 21, 1939 |